United States Patent [19]

Masclet

[11] Patent Number: 4,561,612
[45] Date of Patent: Dec. 31, 1985

[54] WHEEL LEVER LANDING GEAR

[75] Inventor: Jean Masclet, Paris, France

[73] Assignee: Messier-Hispaono-Bugatti (S.A.), France

[21] Appl. No.: 618,863

[22] Filed: Jun. 8, 1984

[30] Foreign Application Priority Data

Jun. 8, 1983 [FR] France ................................ 83 09469

[51] Int. Cl.$^4$ ............................................. B64C 25/58
[52] U.S. Cl. ........................... 244/104 R; 244/102 SS; 244/104 FP
[58] Field of Search ......... 244/102 R, 102 A, 102 SS, 244/103 R, 104 R, 104 FP; 280/670, 693, 696

[56] References Cited

U.S. PATENT DOCUMENTS 2,431,302 11/1947 Bachman et al. .............. 244/104 FP

FOREIGN PATENT DOCUMENTS 888060 12/1943 France ........................... 244/102 SS Primary Examiner—Trygve M. Blix
Assistant Examiner—Rodney Corl
Attorney, Agent, or Firm—Sughrue, Mion, Zinn, Macpeak and Seas

[57] ABSTRACT

The nose wheel landing gear has the wheel (23) coupled to the rest of the landing gear by a deformable parallelogram (20, 37, 33, 13) which is located to one side of the wheel (23), the wheel lever (20) which supports the wheel is only slightly longer than the wheel radius. This arrangement enables the landing gear to be shortened when retracted without the wheel itself being offset sideways, thereby occupying less space overall.

3 Claims, 2 Drawing Figures

WHEEL LEVER LANDING GEAR

The present invention relates to landing gear and more particularly to landing gear of the nose-wheel type as found in particular on aircraft such as combat or fighter planes.

BACKGROUND OF THE INVENTION

In this type of aircraft, it is essential for the nose-wheel landing gear, when in the "retracted" position, to occupy as little space as possible, and in particular as little length as possible. However, for reasons of aircraft structure streamlining, it is also necessary for the wheel to lie in a plane substantially perpendicular to a vertical plane passing though the aircraft axis (when in horizontal flight). Numerous landing gears exist which reduce the space occupied by compacting the landing gear components, eg. by compressing the shock-absorber. There also exist landing gears which, as they pass from the "extended" position for the aircraft to run on a runway for take off or landing, to a "retracted" position, swivel the wheel through ninety degrees. Thus, when the landing gear pivots about about an axis which is perpendicular to the above-defined vertical plane, the wheel which was initially parallel to said plane ends up in a perpendicular plane when the landing gear is fully retracted into the aircraft structure.

However, in all known sytems, as the landing gear is compacted to reduce the space it occupies lengthwise, the wheel is generally shifted sideways relative to the landing gear axis, thus calling for a housing of greater width.

Preferred embodiments of the present invention provide a new nose-wheel type landing gear for aircraft enabling minimal bulk to be achieved by means of a structure which is simple to construct and which additionally avoids the drawbacks of previously known landing gear systems.

SUMMARY OF THE INVENTION

More precisely, the present invention provides a nose wheel type landing gear for aircraft, comprising:
  a shock absorber which is essentially constituted by cylinder and a rod slidably mounted in the said cylinder;
  a sleeve at least partially surrounding the said shock absorber;
  bearings for guiding the said cylinder in translation relative to the said sleeve, the said sleeve including a bracket projecting a certain distance past the the shock absorber in its lowest position;
  at least one running means comprising at least one wheel;
  a wheel lever having one end pivotally mounted about a first axis to the end of the said projecting bracket, and the other end including a second axis about which the said wheel is rotatably mounted;
  a two-arm yoke pivotally mounted about a third axis substantially at its base, a first one of the two arms being situated in a plane to one side of the said wheel, and the second one of the two arms being situated substantially in the plane of the wheel;
  a link rod rotatably mounted at both ends, one end to the said wheel lever and the other end on the said first arm; and
  a connecting rod rotatably mounted at both ends interconnecting the second arm to the bottom end of the said shock absorber cylinder.

BRIEF DESCRIPTION OF THE DRAWINGS

An embodiment of the invention is described by way of example with reference to the accompanying drawings, in which.

Since the two figures show the same landing gear, but in two different positions, it is quite clear that the same references designate the same means and that in the present description it may be necessary to refer to one or the other of the figures.

MORE DETAILED DESCRIPTION

Figure 1:
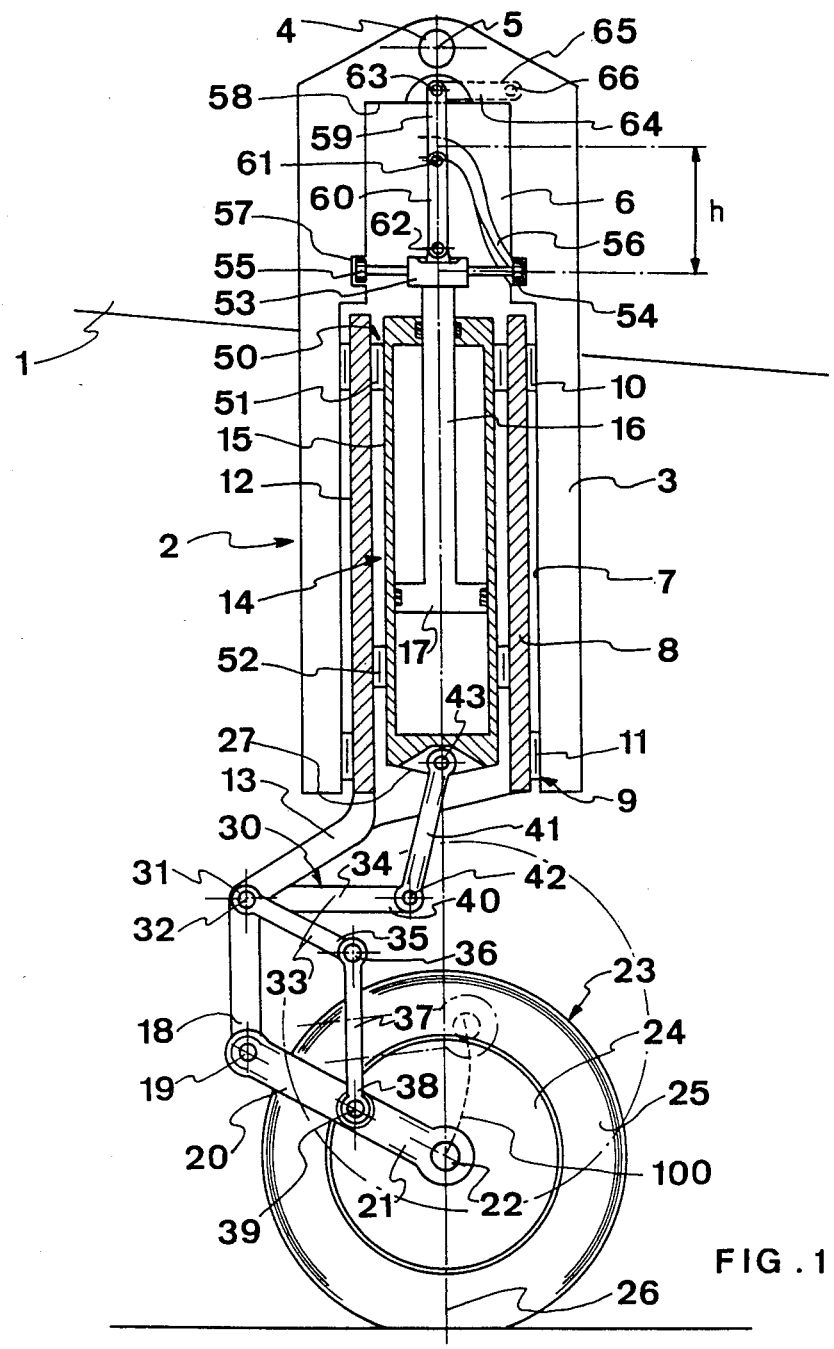
FIGS. 1 and 2 are axial cross sections through the same embodiment of a nose-wheel landing gear for an aircraft, respectively in an "extended" position and in a "retracted" position respectively.

Reference is made more particularly to FIG. 1, which shows an aircraft nose-wheel landing gear. The aircraft with which the landing gear 2 is associated is shown schematically at 1. The landing gear essentially comprises a strut 3 having one end pivotally mounted about an axis 4 situated at a fixed point 5 on the structure 1 of the aircraft. The strut includes a cavity 6 in which, going in from its outside wall 7, there is a sleeve 8 which is advantageously constituted by a hollow circular cylinder mounted to co-operate with bearings 9 enabling the sleeve to pivot relative to the strut 2.

For the purposes of simplification, the bearings 9 are represented as two annular rings 10 and 11 situated between the inside wall 7 of the strut 3 and the outside wall 12 of the sleeve. The sleeve includes a projecting bracket 13 which extends over a length substantially equal to or at most equal to the diameter of a wheel which is normally associated with this type of landing gear.

Inside the sleeve 8 there is the major part of a shock-absorber 14 which is essentially constituted at its bottom end by a cylinder 15 from which there projects a rod 16 suitable for sliding inside the cylinder 15 by piston means 17 which, as is known to the person skilled in the art, include various means such as bleed holes, non-return valves, etc . . . . Likewise, inside the shock-absorber there is a fluid spring chamber of the air chamber type. It has not been drawn, and nor have the preceding items, in order to simplify the drawing, particularly since they are well known in the art, and of themselves.

At the end 18 of the bracket 13 there is a first rotation axis 19 about which a wheel lever 20 is pivoted. The other end 21 of the wheel lever has a second rotation axis 22 on which a wheel 23 constituted by a hub 24 and a tire 25 is rotatably mounted. It should be observed that the distance separating the two rotation axes 19 and 22 is slightly greater than the radius of the wheel 23, and in fact it is advantageous for this length to be as short as possible: just long enough to allow the wheel 23 to rotate without coming into contact with the end 18 of the bracket 13.

Such a landing gear has a general axis 26 which is substantially an axis of symmetry on which the strut 6, the sleeve 8 and the cylinder 15 and the rod 16 of the shock absorber 14 are centered. The axis 26 also passes substantially through the mid plane of the wheel 25. Under these conditions, the lowermost portion 27 of the cylinder is in the same plane as the mid plane of the wheel 23, ie. the lowest point of the cylinder lies on the axis 26. There is thus a problem of connecting the lower portion of the cylinder with the wheel lever which is performed relative to the mid plane. The connection means are constituted by a U-shaped yoke 30 whose base 31 is pivotally mounted about a third axis 32 and whose arms 33 and 34 lie in different planes. In particular, the arm 33 is disposed to one side of the general axis 26 of the shock absorber and substantially in a lateral plane passing on the side of the wheel 23. The end 35 of the arm 33 distant from its base 31 includes an axis of rotation 36 about which one end of a link rod 37 is mounted with the other end 38 of the link rod being pivotally mounted about another axis of rotation 39 in such a manner as to form, together with the arm 33, and parts of the bracket 13 and of the lever arm, a deformable parallelogram.

In contrast, the other arm 34 is situated in the mid plane, ie. a plane passing through the plane of symmetry of the wheel 23 and containing the above-defined axis 26. Thus the end 40 of the second arm 34 is contained in this plane. This end 40 is thus easily connected to the bottom end 27 of the cylinder 15. This end 40 of the arm 34 is connected by a connecting rod 41 which rotatably mounted at both ends about respective axes 42 and 43 belonging to the arm 34 and to the cylinder 15.

Figure 2:
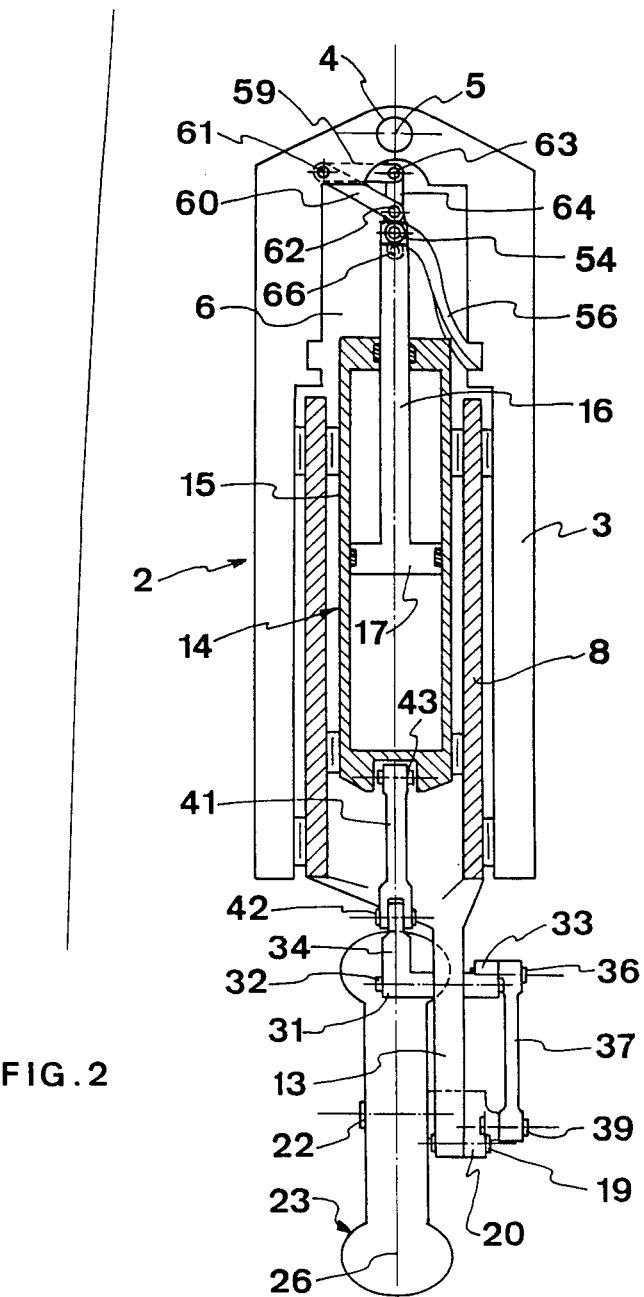

The offset disposition of the two arms 33 and 34 of the yoke 30 is readily seen in FIG. 2.

As is explained below, when the wheel 23 is subjected to shocks, it displaces the cylinder 15 in translation relative to the rod 16. To do this, the cylinder 15 is mounted inside the sleeve 8 by means of sliding bearings 50 which are represented by two rings 51 and 52 disposed near respective opposite ends of the cylinder, which must at all times remain in contact with the bearings 50.

In an advantageous configuration, the projecting portion of the shock absorber rod 16 has wheeled co-operation means at its end 53. There are preferably two such wheels 54 and 55 which are disposed symmetrically about the axis 26 which co-operate with two respective guide rail grooves 56 and 57 which can be seen in FIG. 1. The grooves 56 and 57 are helical in shape and extend over at least 90° over a length h, where h is the length by which the shock absorber is to be shortened as it passes from the "extended" position as shown in FIG. 1 to the "retracted" position as shown in FIG. 2.

This end 53 of the rod 16 is connected to the bottom 58 of the strut by an assembly of two links 59 and 60 which are rotatably mounted at 61 relative to each other with the other ends of the two links being rotatable about two axes 62 at the end 53 of the rod 16 and 63 on an axis situated at the bottom 58 of the strut. The axis 63 passes through the wall of the strut to co-operate fixedly with a rod 64 whose end 65 is pivotally mounted about an axis 66 which is generally fixed to the structure 1 of the aircraft.

It should be mentioned that the axis 62 is connected to the portion 53 of the rod by a knuckle joint enabling the head 53 at the end of the rod to pivot relative to the link 60. The advantage of this feature is explained below, during the explanation of th operations that take place when this landing gear passes from the "retracted" position, for example, to the "extended" position and vice versa.

Finally it is specified that the parts, in particular the cylinder 15 the rod 16 and the sleeve 8 are mounted inside one another in such a manner as to be able to slide relative to one another without being able to rotate relative to one another. This is very simply obtained, for example, by projecting portions co-operating with longitudinal guide slots in known manner.

The above-described shock absorber operates as follows:

The landing gear is supposed to be initially in the "extended" position, ie. in a position as shown in FIG. 1, and the aircraft is running on the ground, eg. on a landing strip during landing, or during take-off.

When the aircraft is running on the ground and meets obstacles, the wheel 23 is subjected to shocks which cause the wheel and the wheel lever to rotate about the axis 19. Since the wheel lever is linked to the end 27 of the shock absorber cylinder 15, in particular by the link rod 37, the yoke piece 30 and the connecting rod 41, the shocks are absorbed.

In FIG. 1, dashed lines show the extreme position the wheel can take up when subjected to a large amplitude shock. In this condition, since the distance separating the axes 19 and 22 is very slightly more than the radius of the wheel, the wheel moves in a substantially vertical plane, ie. the path of the axis 22 shown as dashed line 100 in FIG. 1 follows a trajectory which stays close to the axis 26.

In general, since the arm 33 and the link rod 37 are disposed to one side of the wheel 23 these two members do not hinder the movement of the wheel about the axis 19 in any way, particularly since the arm 34 is linked to the arm 33 as the arm 33 rises. The same is true of the other arm 34 which is situated in the same plane as the wheel, the distance between its end 40 and the top of the wheel remains constant or substantially constant.

The operations above are those which take place when the landing gear is in the "extended" position and the aircraft is running on a runway for take off or for landing or for taxiing to a parking place.

In contrast when this landing gear, more particularly this nose wheel landing gear, is to pass from one of the "extended" or "retracted" positions to the other, a completely different set of operations take place, namely:

(As an aside, it is mentioned that the operations for going from either of the two positions to the other are strictly identical except for reversing their order, which is why the following describes only the passage from the "extended" position shown in FIG. 1 to the "retracted" position shown in FIG. 2).

Consequently, the nose wheel landing gear is assumed to be in the position shown in FIG. 1. Once the aircraft has taken off, the shock absorber is almost completely relaxed and arrives at its maximum downwards stroke which is limited, for example, by stops not shown but presenting no difficulty in manufacture.

To retract the landing gear, the strut is caused to rotate about the axis 4 which is fixed to the point 5 of the aircraft structure, eg. by means of actuators connecting a fixed point of the structure 1 of the aircraft to the strut. In this case, because of the rod 64 which is rotatably linked to point 66 which is itself linked to the structure of the aircraft 1, the two links 59 and 60 move out of alignment by rotating about their axes 61 since relatively speaking the rod 64 appears to rotate clockwise about its point 65 which rotates the link 59 the same way thus moving out of alignment with the link 62 which in turn is rotated anticlockwise so that the links 59 and 60 form an angle as shown in FIG. 2, which angle gets smaller as the strut pivots about the axis 5.

Under these conditions, because of the disalignment of the two links 59 and 60 while the point 63 remains fixed at the bottom of the strut, the point 62 tends to move towards the point 63. Consequently it exerts traction on the rod 16 of the shock absorber, and on the cylinder. As it rises, the cylinder draws on the wheel lever 21 via the connecting rod 41, the yoke 30 and the link rod 37 and causes it to rotate anticlockwise so that the wheel tends to move towards the strut to take up the dashed line position shown in FIG. 1, very close to the bottom strut and following a path 100 which is nearly rectilinear and coincident with the axis 26. Thus, while the wheel 23 is rising towards the strut it does not move sideways, or very little, which would otherwise increase the space taken up sideways by the landing gear. Thus the landing gear is effectively shortened without requiring extra room sideways, which was the desired objective for such a landing gear.

Howver, as has been mentioned above, in certain applications, in particular in fighter or combat planes, it is often advantageous for the wheel to be able to swivel through 90° for example to lie flat inside the structure of the aircraft, ie. in a plane which is horizontal when the aircraft is flying normally in so-called horizontal flight.

Under these conditions, pulling the end 53 of the rod 16 which is linked by a knuckle joint to the end 62 of the link 60 causes the wheels 54 and 55 which are linked to the head 53 to follow respective helical grooves 56 and 57, and thus rotates the shock absorber rod 16 through 90°. Since the rod 16 is movable in translation only relative to the cylinder 15 which is itself linked in translation only to the sleeve 8, the sleeve 8 also rotates through 90°. As can be seen clearly in FIG. 2 the wheel is pressed against the strut to take up a minimum of space longitudinally, and although rotated through 90° the wheel is not offset sideways relative to the axis 26 as has previously been the case.

I claim:

1. A nose wheel type landing gear for aircraft, comprising:
    a shock absorber which is essentially constituted by cylinder and a rod slidably mounted in the said cylinder;
    a sleeve at least partially surrounding the said shock absorber;
    bearings for guiding the said cylinder in translation relative to the said sleeve, the said sleeve including a bracket projecting a certain distance past the shock absorber in its lowest position;
    at least one running means comprising at least one wheel;
    a wheel lever having one end pivotally mounted about a first axis to the end of the said projecting bracket, and the other end including a second axis about which the said wheel is rotatably mounted;
    a two-arm yoke pivotally mounted about a third axis substantially at its base, a first one of the two arms being situated in a plane to one side of the said wheel, and the second one of the two arms being situated substantially in the plane of the wheel;
    a link rod rotatably mounted at both ends, one end to the said wheel lever and the other end on the said first arm; and
    a connecting rod rotatably mounted at both ends interconnecting the second arm to the bottom end of the said shock absorber cylinder.

2. Landing gear according to claim 1, wherein the side arm, part of the wheel lever, the link rod and the bracket form a deformable parallelogram.

3. Landing gear according claim 1 or 2, wherein the length of the wheel lever between the first axis and the second axis is slightly greater than the radius of the said wheel.

* * * * *